United States Patent [19]

Wood

[11] Patent Number: 5,293,904
[45] Date of Patent: Mar. 15, 1994

[54] TRAIN LINE DE-ICER

[76] Inventor: Dennis F. Wood, 3422 Chee Dodge, Gallup, N. Mex. 87301

[21] Appl. No.: 29,570

[22] Filed: Mar. 11, 1993

[51] Int. Cl.⁵ ............................................. E03B 7/14
[52] U.S. Cl. ....................................... 138/35; 138/34; 62/82
[58] Field of Search ................. 138/34, 35, 32; 62/82

[56] References Cited

U.S. PATENT DOCUMENTS

| | | | |
|---|---|---|---|
| Re. 20,108 | 9/1936 | Covyeow | 138/34 |
| 1,336,905 | 4/1920 | Hunzicker | 138/34 |
| 1,702,972 | 2/1929 | Larsen | 138/34 |
| 2,670,130 | 2/1954 | Bloxsom | 138/34 |
| 2,832,528 | 4/1958 | Spears | 138/34 |
| 3,826,101 | 7/1974 | Fischer | 62/82 |
| 4,804,013 | 2/1989 | Wilson | 138/34 |

Primary Examiner—James E. Bryant, III
Attorney, Agent, or Firm—S. Michael Bender

[57] ABSTRACT

A pneumatic liquid injector de-icing system designed for use on air brake lines of a train includes an alcohol storage tank provided with fittings for engagement between the train air supply lines and the train brake lines. The storage tank may be provided with a pressure gauge for monitoring pressure in the system. In use, when operating in cold conditions where brake line freezing is encountered, alcohol is introduced into the brake lines. The alcohol absorbs moisture and thaws ice in the brake lines so as to prevent ice-up. In an alternative embodiment, one line of the storage tank is terminated by a plunger so it may be used to unclog toilets. In yet another alternative embodiment, one line of the storage tank is adapted to be connected to an RV so the latter may be winterized.

1 Claim, 4 Drawing Sheets

TRAIN LINE DE-ICER

BACKGROUND OF THE INVENTION

1. Field of the Invention

The present invention relates to a system and method for thawing out frozen air lines on trains. If the lines become frozen, the brakes on the train cars cannot be released. The freezing usually is created when low temperatures cause moisture in the air lines to turn into ice, thereby blocking the passage of air. Introducing antifreeze or alcohol into the system will drastically lower the freezing temperature of the moisture, thereby thawing it out into a liquid again, thus allowing air to flow through the lines to the brakes.

2. Description oft he Prior Art

The use of de-icers is known in the prior art. More specifically, de-icers heretofore devised and utilized for the purpose of thawing out air lines are known to consist basically of familiar, expected and obvious structural configurations, notwithstanding the myriad of designs encompassed by the crowded prior art which have been developed for the fulfillment of countless objectives and requirements.

A typical fluid line de-icer is described in U.S. Pat. No. 4,804,013 issued to Donald W. Wilson. The de-icer disclosed includes an antifreeze solution storage tank which is mounted to the front panel of a tractor trailer. Similarly, U.S. Pat. No. 3,690,601 issued to Roemke discloses a pneumatic de-icer associated with an airport. None of the above mentioned de-icers are portable, and are therefore limited in their use.

In this respect, the de-icer according to the present invention substantially departs from the conventional concepts and designs of the prior art, and in so doing provides an apparatus primarily developed for the purpose of thawing out air lines in a variety of devices. Therefore, it can be appreciated that there exists a continuing need for new and improved de-icers which can be easily moved from place to place. In this regard, the present invention substantially fulfills this need.

SUMMARY OF THE INVENTION

In view of the foregoing disadvantages inherent in the known types of de-icers now present in the prior art, the present invention provides an improved de-icer. As such, the general purpose of the present invention, which will be described subsequently in greater detail, is to provide a new and improved de-icer and method of use which has all the advantages of the prior art de-icers and none of the disadvantages.

To attain this, the present invention essentially provides a pneumatic liquid injector de-icing system designed for use on air brake lines on a train including an alcohol storage tank provided with fittings for engagement between the train air supply lines and the train brake lines. The storage tank may be provided with a pressure gauge for monitoring pressure in the system. In use, when operating in cold conditions where brake line freezing is encountered, alcohol is introduced into the brake lines. The alcohol absorbs moisture and thus thaws ice in the brake line so as to prevent ice-up.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried our in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved de-icer which has all the advantages of the prior art de-icers and none of the disadvantages.

It is another object of the present invention to provide a new and improved de-icer which may be easily and efficiently manufactured and marketed.

It is a further object of the present invention to provide a new and improved de-icing system which is of a durable and reliable construction.

An even further object of the present invention is to provide a new and improved de-icing system which is susceptible of a low cost of manufacture with regard to both materials and labor, and which accordingly is then susceptible of low prices of sale to the consuming public, thereby making such de-icers economically available to the buying public.

Still yet another object of the present invention is to provide a new and improved de-icing system which provides in the apparatuses and methods of the prior art some of the advantages thereof, while simultaneously overcoming some of the disadvantages normally associated therewith.

Still another object of the present invention is to provide a new and improved de-icing system which is portable and therefore easily moved from one location to another.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
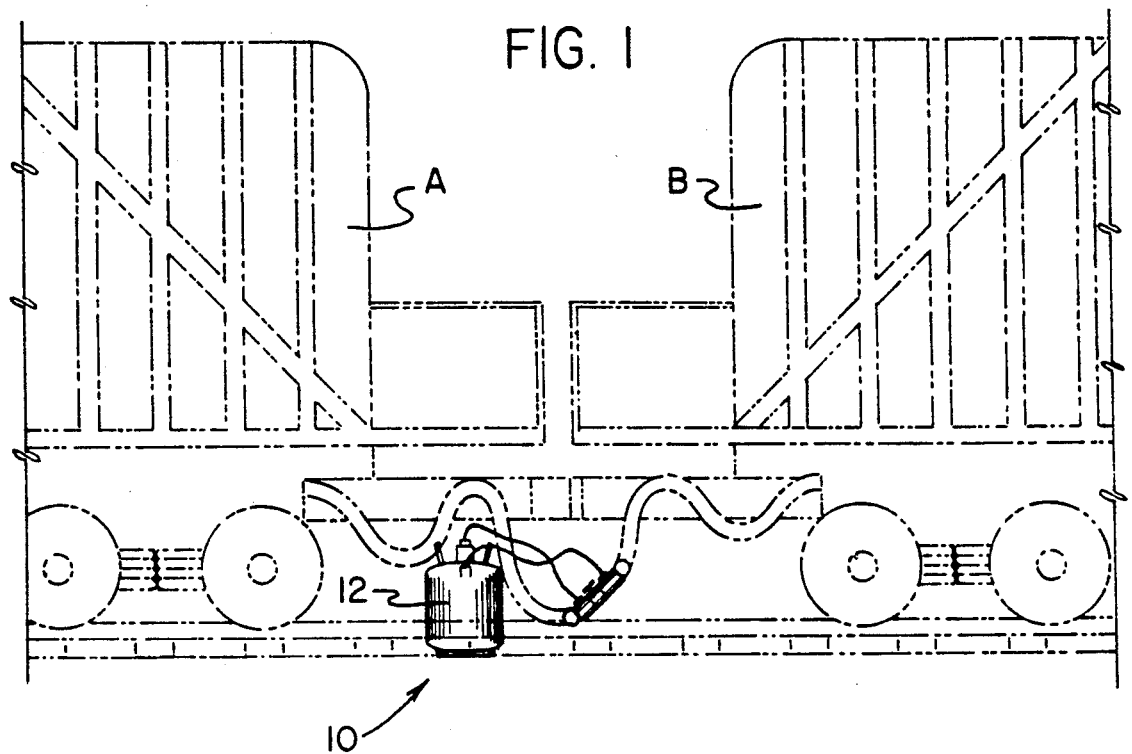
FIG. 1 is an elevation view of the de-icing system of the present invention being used between two cars of a train.
Figure 2:
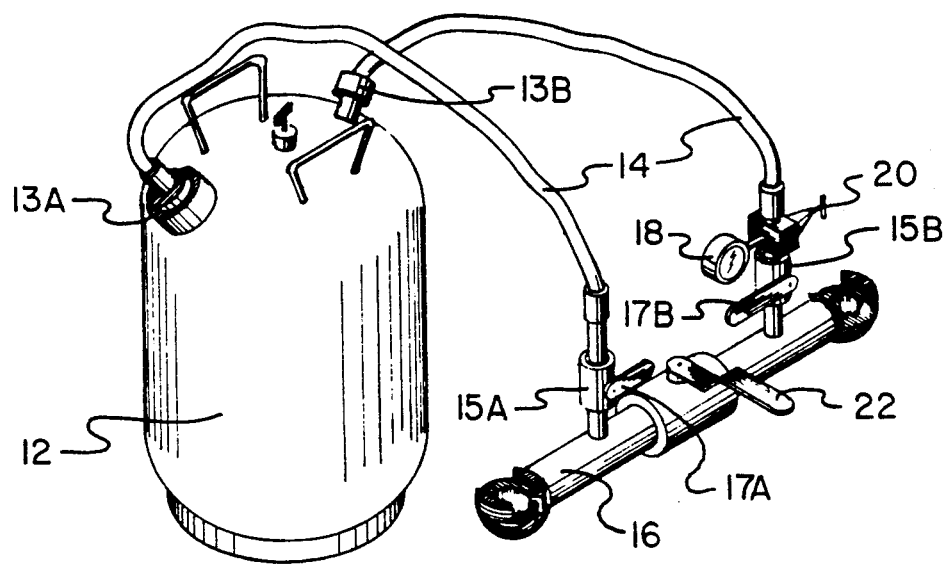
FIG. 2 is a perspective view of the de-icing system of the present invention.
Figure 3:
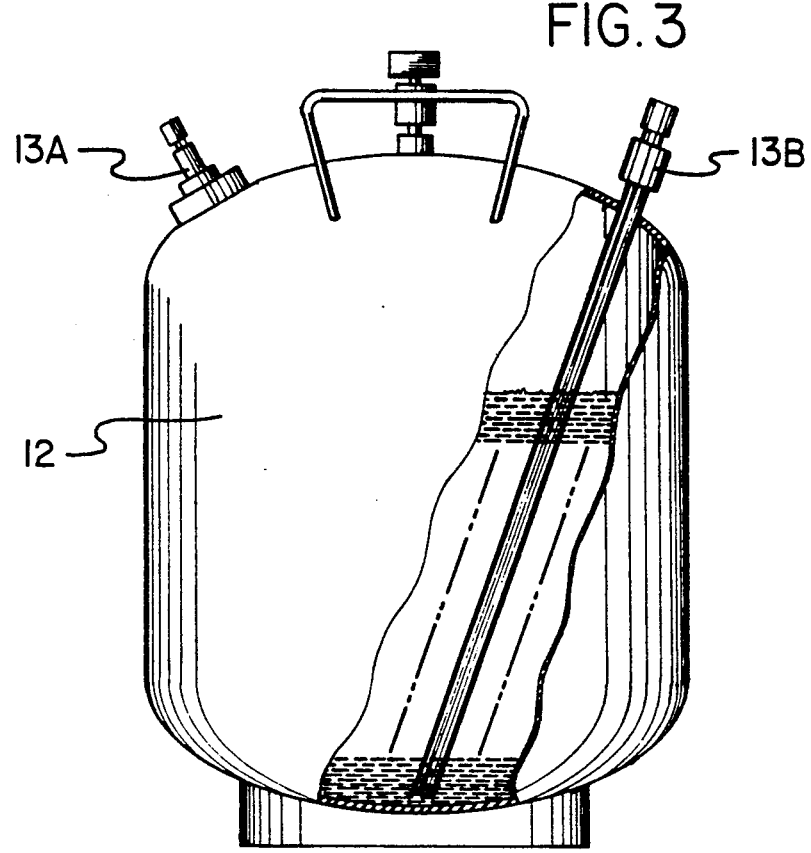
FIG. 3 is an elevation of the storage tank of the present invention.
Figure 4:
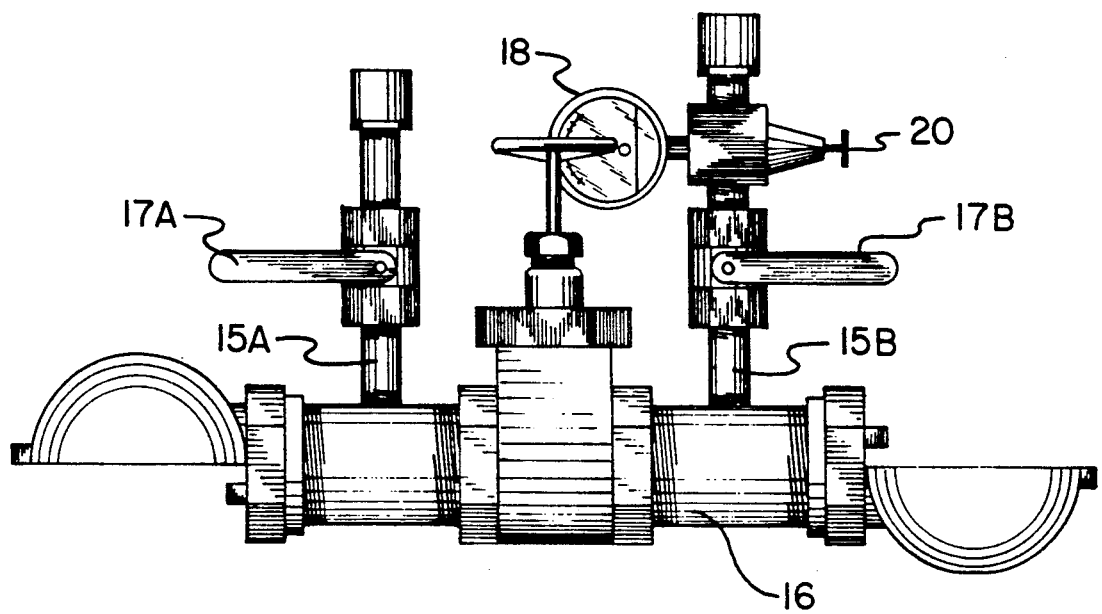
FIG. 4 is a plan view of the valve system and manifold of the present invention.

With reference now to the drawings, and in particular to FIGS. 1-4 thereof, a new and improved de-icing system embodying the principles and concepts of the present invention and generally designated by the reference numeral 10 will be described.

More specifically, it will be noted that a storage tank 12 is placed between train car A and car train car B in FIG. 1. Attached to storage tank 12 by means of fittings 13A, 13B, supply lines 14, and tee elements 15A and 15B is a manifold 16. The manifold 16 also includes a valve 22 between the elements 15A and 15B. Attached to one of the tee elements is a pressure gauge 18 and a pressure regulator 20. The manifold 16 is mounted between the air lines leading to the brakes of the train cars as shown in FIG. 1.

The following procedure should be used to inject alcohol into the train line to melt ice so the brakes will work. 1. Close all air valves on the de-icer and between the locomotive and cars. 2. Install de-icer in train lines with valve 15B to locomotive. 3. Open air line at locomotive and adjust regulator for 30 pounds per square inch in the tank. 4. Open valve 15A to allow alcohol to flood train line. 5. Open train line valve on the car to admit alcohol. 6. When the desired amount of alcohol is in the tank train line shut valve 15A and 15B. 7. Open valve 22 to blow alcohol through the train line. 8. When alcohol is in the train line close train line valve and remove de-icer. Then reconnect lines and open valves.

Figure 5:
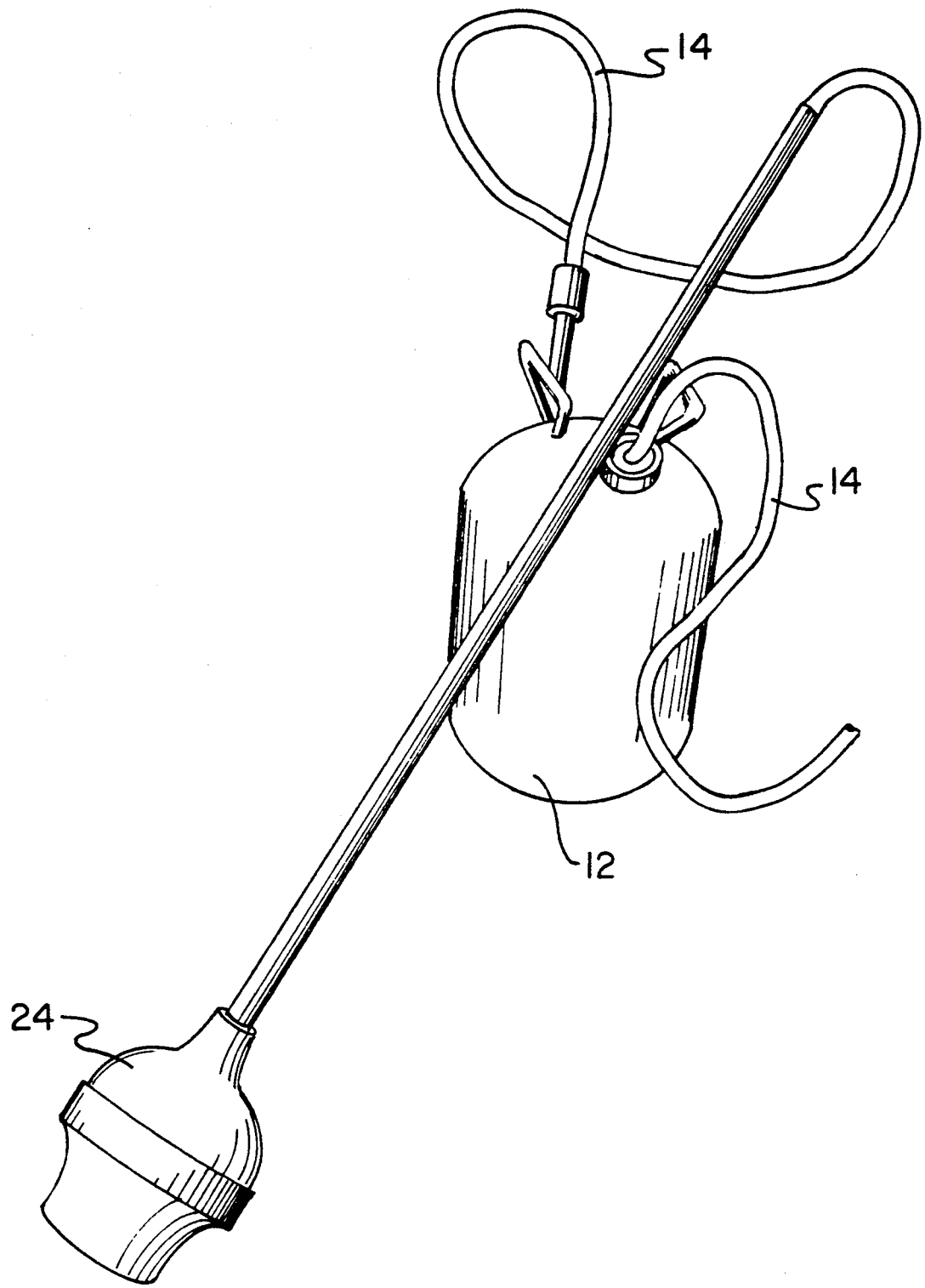
FIG. 5 is a perspective view showing the system of the present invention being used in conjunction with a toilet plunger.

Although the present system has been primarily designed to thaw the air lines in trains, it has many additional uses. For example, in FIG. 5 it can be seen that by attaching the present system to an ordinary plunger 24 the system may be used to unclog toilets and drains.

Figure 6:
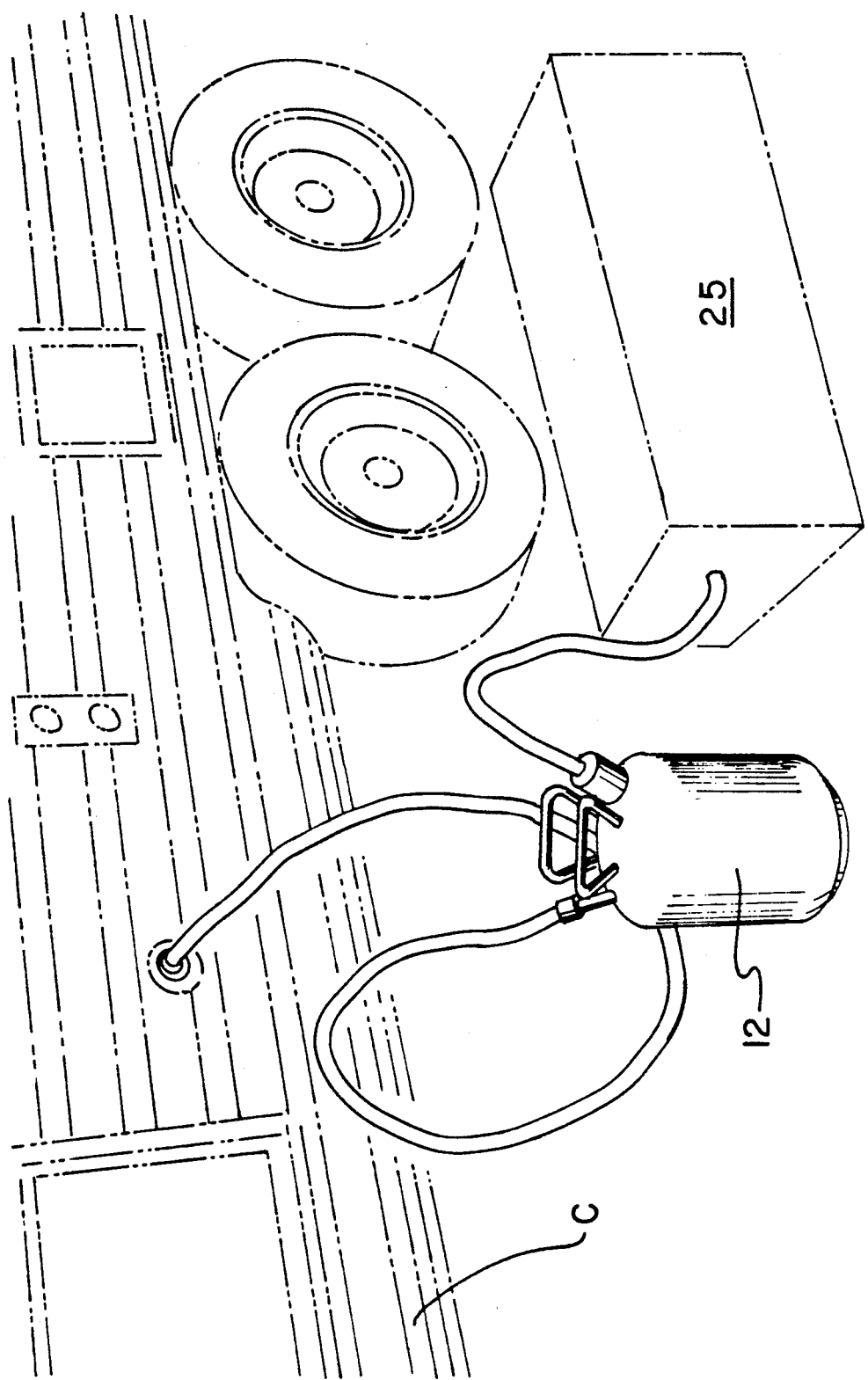
FIG. 6 is shows the system of the present invention being used in conjunction with a recreational vehicle.

Referring now to FIG. 6. FIG. 6 shows that the present system along with an air supply 25 may be used to winterize a recreational vehicle C.

It can be appreciated that the system of the present invention is totally portable and may be easily moved from one location to another. Therefore the system may easily be used with a variety of devices.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pneumatic liquid injector de-icing system for use on air brake lines of a train comprising:
    a portable alcohol storage tank, said storage tank having an input and an output, a manifold connected to said storage tank by first and second supply lines, said first supply line connected between said manifold and said input through a first tee connection, said second supply line connected between said manifold and said output through a second tee connection, a pressure gauge and a pressure regulator connected between said first tee connection on said manifold and said storage tank in said first supply line, said first supply line including a first shut-off valve between said manifold and said pressure regulator, said second supply line including a second shut-off valve between said storage tank output and said manifold, and said manifold further including a gate valve mounted between said first and second tee connections, said manifold having opposed end fittings for enabling said manifold to be connected in the air-brake line of a train by connection to said opposed end fittings whereby opening of said first and second shut-off valves and closing of said gate valve causes air under pressure in said brake line to flow into said storage tank thereby causing alcohol in said storage tank to be fed under pressure into said train air-brake line through said second supply line.

* * * * *